UNITED STATES PATENT OFFICE.

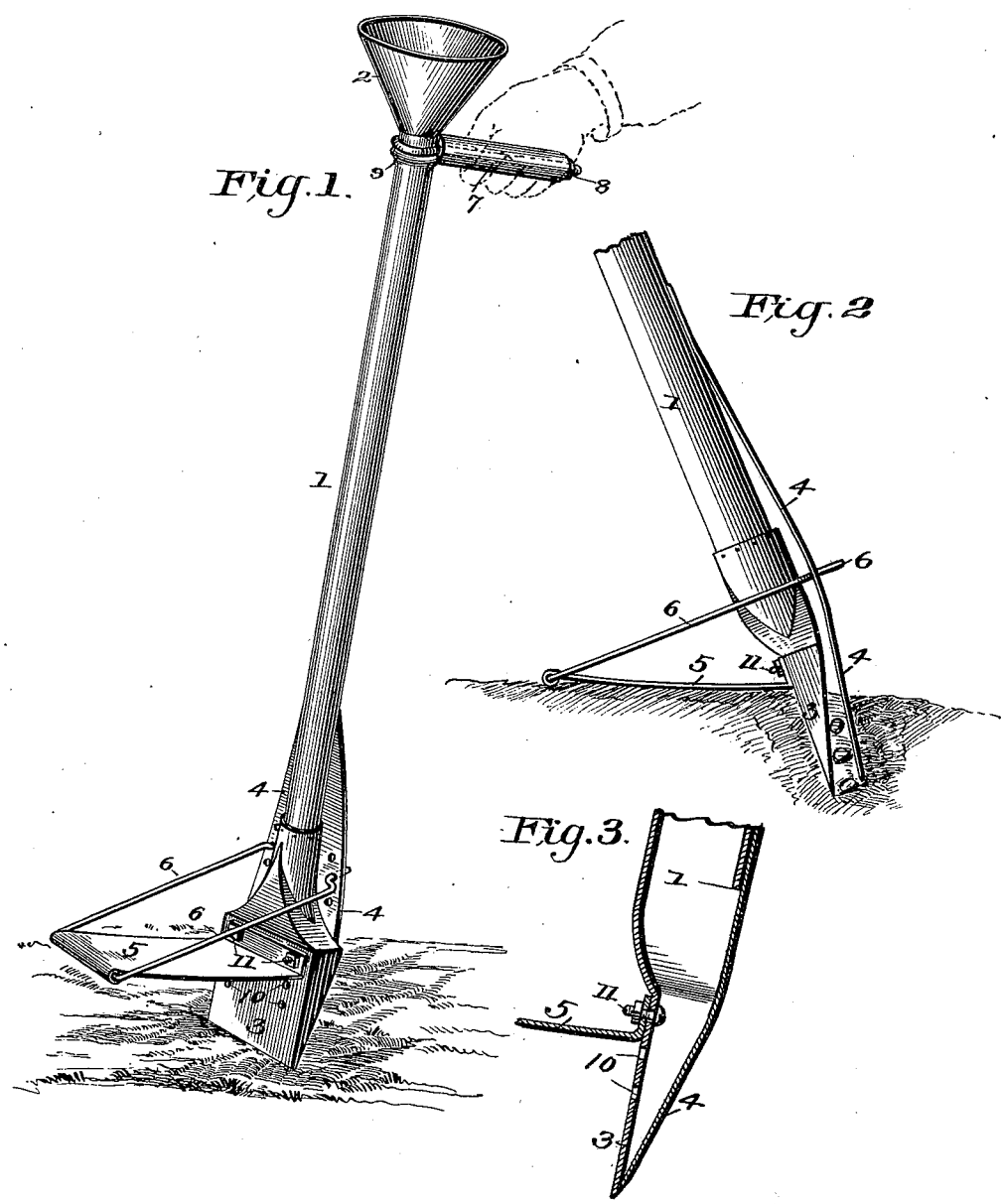

CHARLES NEWMAN, OF SPRINGFIELD, MISSOURI.

HAND-PLANTER.

SPECIFICATION forming part of Letters Patent No. 643,524, dated February 13, 1900.

Application filed November 28, 1899. Serial No. 738,547. (No model.)

*To all whom it may concern:*

Be it known that I, CHARLES NEWMAN, residing at Springfield, in the county of Greene and State of Missouri, have invented a new and useful Improvement in Hand-Planters, of which the following is a specification.

My invention is an improvement in hand-operated devices for planting corn, potatoes, and other seeds. The features of novelty are hereinafter set forth.

In the accompanying drawings, Figure 1 is a perspective view of my planter. Fig. 2 is a side view of the power portion of the planter, showing the same in actual use. Fig. 3 is an enlarged longitudinal section of the point of the planter.

The body 1 of the planter consists of an elongated tube constructed of thin sheet-steel or other suitable metal. This tube has a funnel-shaped open top or hopper 2, which receives the seed, and the latter falls by gravity into the wedge-shaped point 3, one side of which is formed of a spring-jaw 4, that opens, as shown in Fig. 2, for the periodical discharge of the seed as the operator walks along. The said point 3 may be constructed integrally with the tube 1 as an enlarged extension thereof, or said point 3 may be drawn or stamped into the form of a tube at its upper end and slid on over the bottom of tube 1 and attached thereto. The point 3 is open on the rear side, the opening being normally closed by the aforementioned part 4. The latter is formed of a long flat plate-spring, which is slightly curved to adapt it to its place and is rigidly secured at its upper end to the body or tube 1. This spring-jaw is opened by the leverage applied by a horizontal foot 5 through the medium of rods 6—that is to say, the inner upturned end of the spring-foot 5 is secured to the flat front side of the wedge-point 3, and the rods 6 are connected with the free front end of said foot 5, while their rear ends engage the spring-jaw 4 above the point 3.

For convenience and simplicity of connection of the rods 6 and jaw 4 the former pass through holes in the latter and have lateral bends, forming shoulders that engage it, as shown.

The planter is carried and manipulated by a handle or hand-grip 7, which is secured to the tube just below the hopper 2 by means of a stout wire or thin rod, having an eye that clasps the tube 1, while its threaded shank passes through the wooden handle and is secured by a nut 8. Thus the handle 7 may be clamped as tightly on the tube 1 as required to hold it rigid. As an aid to this end I provide the tube with a rib 9, between which and the funnel-top or hopper 2 the eye of the handle is held. Said rib is swaged out of the body of the tube 1.

The operation of my planter is as follows: The operator walks in a straight line across the duly-prepared field and alternately raises and lowers the planter at each step. The wedge-point 3 thus enters the soil once at each step, and as the tube 1 is then inclined forward and, as shown in Fig. 2, also pressed downward the free end of the spring-foot 5 is pressed upward and the spring-jaw thus opened by the leverage applied through the rods 6, which allows discharge of a due quantity of seed.

It will be seen that the foot 5 constitutes a stop or gage, since it limits the depth to which the point 3 may enter the ground. To provide for convenient adjustment of the same for the purpose of regulating the depth of insertion of said point 3, a series of rows of holes 10 is formed in the front side of the point, so that the screw-bolts 11, that secure the foot 5, may be placed higher or lower.

The bottom part of my planter, consisting of the point 3, shaped to the body at its top end, with its series of rows of holes 10, its spring-jaw 4, its combined spring-foot and depth-gage 5, and arms 6 and bolts 11, as above described, may be attached to the bottom of a wood-stock body also and will obviously there automatically work to open and let the seed into the ground and regulate the depth of the planting the same as when attached to a tubular body.

Having thus described my invention, what I claim, and desire to secure by Letters Patent, is—

1. A hand seed-planter having a wedge-shaped point which is open on the rear side, a spring-jaw for closing the opening, a spring-foot attached to the point, and rods connected therewith at the front end and with the spring-jaw between its ends, as shown and described.

2. A hand seed-planter having a metallic point, provided with a discharge-opening, a spring-plate which constitutes a depth-gage, the same being attached to the point and adapted for vertical adjustment, means for detachably and adjustably securing the said gage in place, a spring-jaw applied to normally cover the discharge-opening, rods attached to the free front end of said gage, and having a detachable connection with the spring-jaw, as shown and described.

3. A hand seed-planter having a metallic point provided with a series of transverse rows of holes, a combined spring-foot and depth-gage and means for securing it to said point adjustably, substantially as specified.

4. A hand seed-planter having a tubular sheet-metal body, provided with a swaged collar, or rib, and an enlarged or funnel-shaped top, and a handle having an eye arranged between said rib and top, as shown and described.

CHARLES NEWMAN.

Witnesses:
ROBERT M. SELLERS,
JOHN R. HOLLAND.